Feb. 14, 1967   B. L. KOFF ETAL   3,303,998
STATOR CASING
Filed July 18, 1966   2 Sheets-Sheet 1
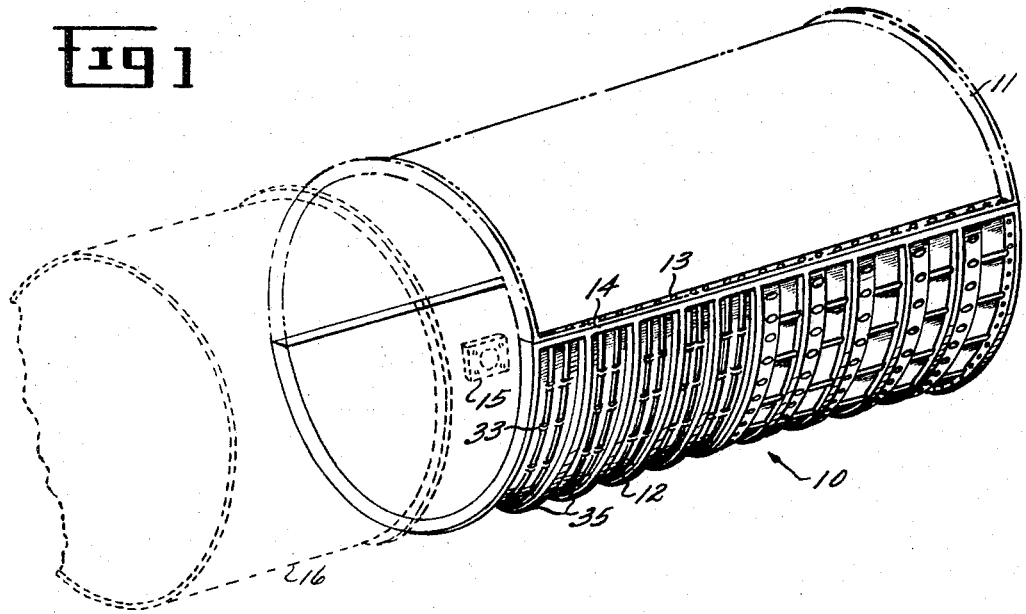
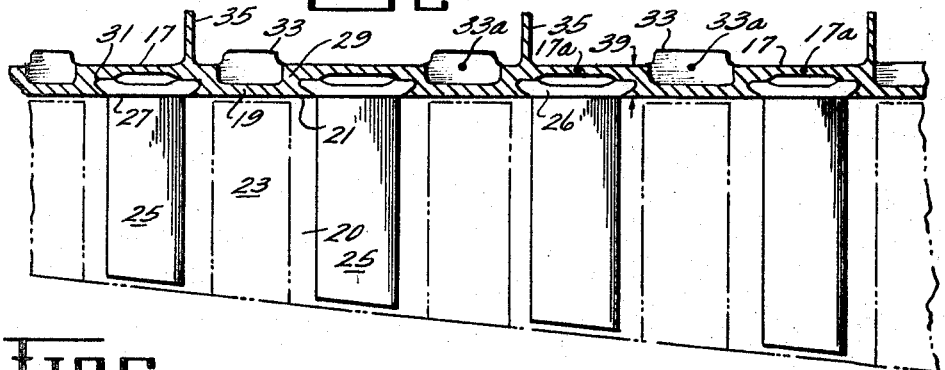
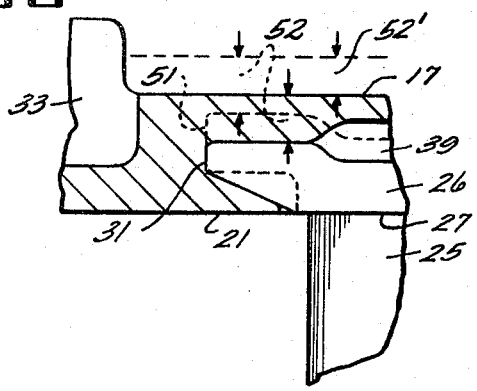
INVENTORS
BERNARD L. KOFF
JOSEPH C. BURGE
BY
George R. Powers
ATTORNEY Feb. 14, 1967     B. L. KOFF ETAL     3,303,998
STATOR CASING
Filed July 18, 1966     2 Sheets-Sheet 2
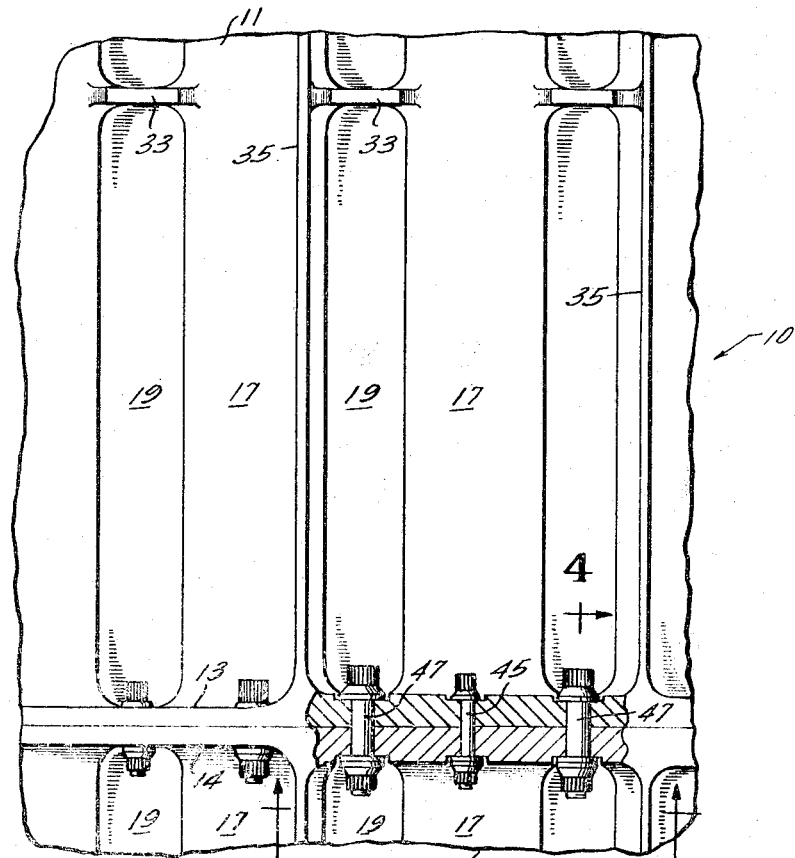
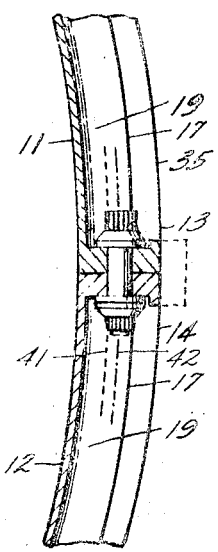
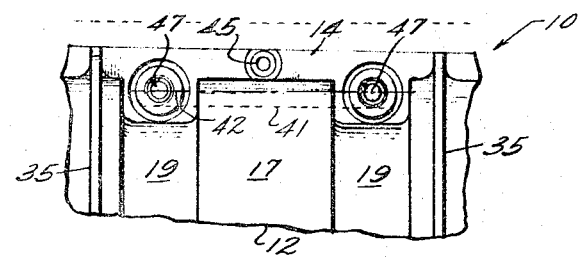
INVENTORS:
BERNARD L. KOFF
JOSEPH C. BURGE
George R. Powers
ATTORNEY

United States Patent Office 3,303,998
Patented Feb. 14, 1967

---

3,303,998
STATOR CASING
Bernard L. Koff and Joseph C. Burge, both of Cincinnati, Ohio, assignors to General Electric Company, a corporation of New York
Filed July 18, 1966, Ser. No. 565,980
7 Claims. (Cl. 230—133)

This application is a continuation-in-part of a copending application entitled, Stator Casing, Serial No. 440,873, filed on March 18, 1965, now abandoned in the names of Bernard L. Koff and Joseph C. Burge, and assigned to the assignee of this application.

The present invention relates to a stator casing and, more particularly, to a casing employing an extremely rigid and lightweight corrugated structure made of thin material.

In the aircraft field, stator casings for aircraft gas turbine engines are ideally designed for maximum structural integrity, maximum rigidity, minimum weight and reasonable cost. The largest single stator casing on a gas turbine engine is the compressor casing which with the frame members may be used as the basic supporting structure of the engine, the casing and its associated structure supporting most of the rotating machinery as well as providing the basic mounting structure from which the engine is supported in an airframe from mounting pads locating on the casing. The compressor casing may also be used to support the engine accessories.

Modern jet engines are going to higher rotational speeds and compression ratios. This results in higher pressures on the stator casings and, consequently, need for more rigid casings. It is desirable that this increased rigidity be obtained without the addition of bulk and accompanying weight. In addition, a well known form of engine uses variable stator vanes which require the addition of pivoting linkages and mechanisms in order to vary some of the stages of the stator vanes; this arrangement requires an extremely rigid member upon which to mount the variable geometry mechanism.

In view of the foregoing requirements, it is desirable that the casing be of as thin, rigid, and lightweight construction as possible. It is well known that a basic cylindrical construction is extremely rigid and solid. However, such construction leaves much to be desired since it does not provide many of the functions required of a compressor casing. Accordingly, it has been typical to use a modified cylindrical construction comprising a cylindrical shell with various interior rib or rail arrangements for mounting the stator vane platforms. The flow path above the rotating blade tips may be comprised of extensions of the stator vane platforms or separate casing liners. A typical arrangement uses a linear configuration wherein a liner, by a track arrangement, is slid into the stator casing to fit closely over the rotor blades. This permits the use of a constant diameter outer shell for the casing, but results in an arrangement which is double walled, the result being added weight and complexity. The inner liner or casing wall makes a negligible contribution to casing rigidity since it is not rigidly attached to the remainder of the casing. In addition, many such casings are fabricated of separate parts bolted together and thus involve many separate machinings and consequent manufacturing expenses and facilities for fabrication.

As an improvement over the basic cylindrical and modified cylindrical casings, the use of corrugated or bellows-like casings have been proposed in the past. The use of such arrangements provide the offset features necessary to accommodate some of the necessary casing functions, but corrugated arrangements as used heretofore are inherently flexible, tending to stretch out under axial loads and, at the same time, being flexible under bending moments. In other words, the corrugated bellows casing has been thought to be too flexible for use as a casing unless it is a semibellows arrangement with the corrugations partially filled in or otherwise reinforced with metal to add rigidity. Such known arrangements have not been entirely satisfactory since they typically add significantly to weight as well as to strength and rigidity.

Accordingly, it is an object of this invention to provide an improved lightweight casing having strength, rigidity, and structural integrity.

Another object of this invention is to provide for turbomachinery a lightweight casing not requiring numerous elements such as liners and the like which add to weight and complexity without contributing to strength and rigidity.

A further object is to provide a turbomachine casing which not only possesses the foregoing objects, but also is relatively simple and capable of being manufactured at a reasonable cost.

Briefly stated, in carrying out the invention in one form, an annular stator casing for a jet engine compressor, or other turbomachine, comprises a pair of lightweight abutting semi-cylindrical segments having axially extending flanges along their abutting edges. The thin-walled segments, or a large portion thereof, are axially corrugated with, as viewed from the exterior, alternating shell members forming arcuate ridges and grooves. On the interior of the casing, the thin-walled material forming the exterior ridges forms channels for holding the stator blades, and the material forming the exterior grooves forms interior lands located in proximity to the tips of the rotor blades. This provides an extremely lightweight construction since separate elements, such as liners used to define a flow path boundary in conventional casings, are not necessary. The corrugated casing preferably includes radial walls interconnecting adjacent shells and the casing is made rigid by a plurality of axially aligned and circumferentially spaced ribs interconnecting the ridges and extending through the grooves on the outer surface of the casing. To provide maximum rigidity in combination with minimum weight, the ribs are extended radially outward of shells forming the ridges a calculated distance sufficient to align or substantially align, the centroids, of the ribs with the centroids of the adjacent ridge portions of the casing. This assures minimum bending moments on the radial walls interconecting adjacent ridges and grooves, thereby permitting a further reduction in size and weight. By a further aspect of the invention, the casing segments are joined together along the flanges by tangential bolts or other suitable clamping means located radially within the grooves such that the bolt stresses are directed substantially along the lines of the action of the hoop stresses. This permits a substantial reduction in flange width and weight as well as reducing the bending moments acting on the flanges. The overall thickness and weight of the casing is further reduced by tapering the channel tracks for holding the stator vanes, and the casing may be strengthened further by axially spaced circumferential ribs disposed between the ridges and grooves in substantial alignment with the radial walls.

While the specification concludes with claims particularly pointing out and distinctly claiming the subject matter which is regarded as the invention, it is believed the invention will be better understood from the following description taken in connection with the accompanying drawings in which:

FIG. 1 is a perspective view of a general annular stator casing formed in two segments that are flanged together along a horizontal plane;

FIG. 2 is a partial enlarged cross-sectional view through the wall of the casing illustrating the corrugated construction utilized at the left end of the casing of FIG. 1;

FIG. 3 is a partial view, partially in section, of the casing wall;

FIGS. 4 and 5 are partial views illustrating the bolting arrangement along the flanges, FIG. 4 being taken on line 4—4 of FIG. 3 and FIG. 5 being taken on line 5—5 of FIG. 4; and FIG. 6 is a partial view through the stator casing illustrating the taping construction for reducing the casing thickness.

It should be appreciated that the stator casing described herein is applicable to any rotating machinery because of its inherently rigid construction. It was particularly designed for a high pressure ratio compressor casing of a jet engine and, for convenience, will be described in connection with such use, but the invention is not limited to use with compressor casings. Also, the entire casing may be formed of the corrugated construction or, as illustrated, a large portion thereof.

Referring first to FIG. 1, there is shown generally a compressor casing 10 which may be conveniently formed of a pair of abutting semi-cylindrical segments 11 and 12 disjoined in the manner of this invention along axially extending flanges 13 and 14. The structure as described is preferably formed in two segments as in the general construction of jet engine stator casings. The left end of the casing 10 as viewed in FIG. 1 has its segments 11 and 12 formed of generally corrugated shape with, as viewed from the exterior in FIGS. 1 and 2, a first plurality of annular, axially spaced-apart shells 17 forming ridges and a second plurality of annular, axially spaced-apart shells 19 forming grooves alternating with the shells 17. The shells 19 are of smaller diameter than the adjacent shells 17 to provide the corrugated shape, and adjacent shells 17 and 19 are interconnected by radial walls 29. In other words, the casing is made up of a series of shells 17 and 19 joined by inherently strong flat plate radial walls 29 so that the structure is a shell (ridge) 17, flat plate radial wall 29, shell (groove) 19, radial wall 29, shell 17, etc. In order to provide a working fluid passage 20 without the need for additional structure, the inner surfaces 21 of the shells 19 actually form a part of the outer boundary of the passage 20. Rotor blades 23 operate in close clearances with the surfaces 21. In order to provide the remainder of the compressor structure, stator vanes 25 are provided with their platforms 26 received in suitable channels or tracks 31 formed by the radial walls 29 and the inner surfaces of the shells 17. The stator vanes extend radially inwardly from their platforms 26 across the passage 20, the inner surfaces 27 of the vane bases 26 forming the remaining portion of the outer boundary of the passage 20. Thus, the entire outer boundary of the flow passage 20 is defined within the casing 10 by the corrugated casing and the stator vanes without any additional elements which would add to overall weight.

The structure as just described is basically similar to previously known bellows-type casings which are generally susceptible to deformation under axial loads and bending moments, the casings tending to straighten out or bend under such loading. To avoid the inherent flexibility present in a pure bellows or corrugated arrangement under axial loads and bending moments, the present invention provides a plurality of separate, axially aligned and peripherally spaced ribs 33 that are rigidly connected to adjacent shells 17 and the intermediate shell 19 by fairing or filleting into the shells 17 and 19. The ribs extend across the shells 19 on the outer surface of the casing as shown in FIGS. 2 and 3. These ribs 33, which preferably extend slightly beyond the outer surfaces of the shells 17 as shown, tie the whole structure together and maintain the flat plate radial wall and shell structure of the casing intact. In other words, the shell 17-radial wall 29-shell 19 corrugated arrangement is made solid and rigid by the interconnecting ribs 33. These ribs are strategically placed peripherally around the segments to tie the whole structure together.

The ribs 33 have been described as extending slightly beyond the outer surfaces of the ridges 17. In the preferred practice of the invention, this distance is carefully selected such that the centroids 33a, or centers of mass, of the ribs and associated portions of the shells 19 are radially aligned, or substantially aligned, with the centroids 17a of the material forming the ridges 17. With little or no radial offset between the centroids 33a and 17a, axial loads and bending moments on the casing 10 will be transmitted between adjacent ridges 17 through the ribs 33 on essentially straight and uninterrupted lines of action. This arrangement minimizes bending moments on the radial walls 29, which may therefore be of lighter weight construction than would otherwise be required.

In the manufacture of such a casing, the casing may be forged in a complete ring and then machined to size and split along its flange lines. The ridges and grooves are then milled out, leaving the ribs 33 as shown in FIG. 3 so that the entire corrugated structure is a complete one-piece integral structure requiring no fabrication or welding. The casing may be additionally stiffened by the provision of spaced circumferential ribs 35 that are disposed between the shells 17 and 19 as shown in FIG. 2 substantially as an extension of the radial walls 29. These thin ribs 35 add substantially to the overall-rigidity of the casing 10, but not to total weight, since their lightweight and thin radially extending configuration is characterized by a relative high moment of inertia.

The casing arrangement thus far described provides an extremely thin and lightweight structure. In the practice of the invention, it has been found that it is possible to provide a strong and rigid casing for modern jet engine compressors in which the maximum thickness of the shells 17 and 19 is no greater than one third the largest radial dimension of the casing as shown by the distance indicated by reference numeral 39 in FIG. 2. With the use of titanium or a similar lightweight material, an extremely lightweight rigid casing is formed.

A further aspect of the present invention will now be described by reference to FIGS. 4 and 5. During the compressor operation, substantial hoop stresses exist in the casing 10. These stresses must be resisted by suitable clamping means such as bolts 47 holding the segments 11 and 12 in abutment at the flanges 13 and 14. Heretofore, these hoop stresses in a cylindrical casing have acted at a smaller radius than the resisting bolt stresses since the flanges must extend radially outward of the outer periphery of the casing. As a result, the flanges, which thus have been subject to bending moments during operation, must be sized to resist the stresses imposed by these bending moments. By the present invention, it is possible to reduce these bending moments by placing the bolts 47 such that the forces exerted thereby are directed along lines of action relatively close to or even in radial alignment with the line of action of the hoop stresses. As illustrated by FIG. 4, the hoop stresses in the casing 10 may be represented by forces acting along lines of action 41 approximately midway radially between the ridges 17 and the grooves 19. By placing tangential bolts 47 radially within the grooves 19 as shown by FIGS. 4 and 5, the longitudinal axes 42 of the bolts 47 may be made to closely approach the lines of action 41. By minimizing this radial offset, bending moments in the flanges 13 and 14 are minimized, and flange thickness may thereby be minimized. Furthermore, since flange width is determined solely by the size of the bolts 47, the radial width and weight of the flanges are substantially less than if the bolts 47 were located outwardly of the ridges 17 (see broken line representation). It will thus be appreciated that the bolt placement of the present invention contributes significantly to a lightweight structure.

If desired, small bolts 45 may be placed outwardly of the ridges 17 to prevent flange leakage. The bolts 45 are not intended to function as primary supporting means in the manner of the bolts 47, and the size of the bolts 45 is determined by the available flange width, which as discussed above is determined by the strength requirements of the bolts 47.

The casing 10 is further reduced in thickness and weight by means of tapering the channels or tracks 31 which receive the vane platforms 26. With reference to FIG. 6, a conventional manner of mounting stator vanes is illustrated by broken lines, the platforms being received in an undercut slot 51 and the required thickness 52 of the shell 17 being provided outwardly of the slot 51. By providing a tapered slot 31 which terminates at the radially inner ends of the radial walls 29 and a complementary vane platform 26 as illustrated by solid lines, the same shell thickness 52 may be provided by a casing reduced in overall thickness by an amount represented by the numeral 52'. This results, of course, in a further reduction in casing weight from that heretofore attainable.

Violent flight maneuvers or certain failures, such as failures of rotating blades, can rub and possibly tear away the thin casing material, particularly at the thin shells 19. The ribs 33 act as very effective stops against this type of casing erosion. In other words, if a rotating blade fails, it may be thrown through the casing at a shell 19, but it will merely punch a hole since the ribs 33 will almost always prevent substantial propagation of such an opening. Even if, however, a rub or failure were to remove an entire circumferential section of the casing 10, the ribs 33 would still maintain a large portion of the casing rigidity and structural integrity by still securing adjacent shells 17.

It will be apparent that the corrugated casing structure of this invention effectively wraps the casing around the vane platforms and blade tips to conserve material and weight by placing the material precisely where it is required functionally. At the same time, the thin casing is completely held together in a rigid structure by the use of the axial ribs 33 and the circumferential ribs 35 so that all of the casing cross-section contributes to structural integrity and rigidity. The bolts for joining the casing segments are placed closer to the line of action of hoop stresses to reduce bending moments in the flanges. As a result, the flanges are also reduced in size and thickness from that heretofore attainable to thereby reduce further the overall weight. The casing structure is thus sufficiently rigid to act as the engine backbone, serving as a mounting structure for the entire engine as well as carrying the normal accessories on the outer surface.

While there has been described a preferred form of the invention, obvious modifications and variations are possible in light of hte above teachings. It is therefore to be understood that, within the scope of the appended claims, the invention may be practiced otherwise than as specifically described.

What is claimed as new and is desired to secure by Letters Patent of the United States is:

1. In a turbomachine, a stator casing comprising:
    a corrugated wall including a first plurality of annular, axially spaced-apart shells, a second plurality of annular, axially spaced-apart shells alternating with said first plurality of shells, each of said second plurality of shells being of smaller diameter than the adjacent shells of said first plurality, and a plurality of radial wall members interconnecting adjacent shells,
    axially extending and peripherally spaced ribs each rigidly interconnecting a pair of adjacent shells of said first plurality and the intermediate shell of said second plurality,
    said rib extending radially outward of said pair of shells a distance sufficient to substantially align radially the centroid of said rib and the associated portion of said intermediate shell with the centroids of said pair of shells so that loads may be transmitted between said pair of shells through said rib without exerting substantial bending moments on the interconnecting radial walls,
    whereby said corrugated wall may be of relatively lightweight construction.

2. A stator casing as defined by claim 1 in which said corrugated wall includes at least a pair of axially abutting segments,
    axially extending, radially projecting flanges along abutting segments edges,
    a plurality of clamping means for joining abutting flanges,
    said clamping means axially aligned with said shells of said second plurality in radial proximity thereto such that said flanges may be of minimum radial width and the stresses in said clamping means may be directed substantially along the lines of action of hoop stresses in said corrugated wall.

3. A stator casing as defined by claim 2 in which said clamping means comprise tangential bolts extending through abutting flanges.

4. In a turbomachine, a stator casing comprising:
    a pair of axially abutting segments forming a corrugated wall including a first plurality of annular, axially spaced-apart shells, a second plurality of annular, axially spaced-apart shells alternating with said first plurality of shells, each of said second plurality of shells being of smaller diameter than the adjacent shells of said first plurality, and a plurality of radial wall members interconnecting adjacent shells,
    axially extending and peripherally spaced ribs each rigidly interconnecting a pair of adjacent shells of said first plurality and the intermediate shell of said second plurality,
    axially extending, radially projecting flanges along abutting segment edges,
    a plurality of tangential bolts for joining abutting flanges,
    said tangential bolts axially aligned with said shells of said second plurality in radial proximity thereto such that said flanges may be of minimum radial width and the stresses in said tangential bolts may be directed substantially along the lines of action of hoop stresses in said corrugated wall.

5. A stator casing as defined by claim 4 in which said radial walls and the inner surfaces of said first plurality of shells form a plurality of circumferential channels for receiving stator vanes and the inner surfaces of said second plurality of shells form at least a portion of the outer boundary of a fluid flow passage surrounded by said stator casing.

6. A stator casing as defined by claim 5 in which said channels are undercut with tapering side walls to reduce overall casing thickness, said tapering side walls terminating at the radially inner ends of said radial walls.

7. A stator casing as defined by claim 6 in which each of said axially extending and peripherally spaced ribs rigidly interconnecting a pair of adjacent shells of said first plurality and the intermediate shell of said second plurality extends radially outward of said pair of shells a distance sufficient to substantially align radially the centroid of the rib and the associated portion of said intermediate shell with the centroids of said pair of shells so that loads may be transmitted between said pair of shells through said rib without exerting substantial bending moments on the interconnecting radial walls, whereby said corrugated wall may be of relatively lightweight construction.

References Cited by the Examiner

UNITED STATES PATENTS

| | | | |
|---|---|---|---|
| 2,379,183 | 6/1945 | Price | 230—114 |
| 2,501,614 | 3/1950 | Price | 230—122 |
| 2,540,991 | 2/1951 | Price | 230—122 |
| 2,857,093 | 10/1958 | Warnken | 230—133 |
| 2,898,030 | 8/1959 | Hull | 230—133 |
| 2,980,396 | 4/1961 | Movsesian | 253—78 |

FOREIGN PATENTS 995,228   6/1965   Great Britain.

DONLEY J. STOCKING, *Primary Examiner.*

H. F. RADUAZO, *Assistant Examiner.*